March 21, 1950     T. F. BOYD     2,500,926
X-RAY SPECTROMETER HOLDER AND METHOD
Filed July 11, 1947
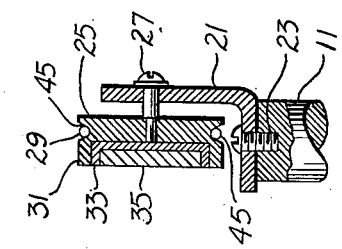
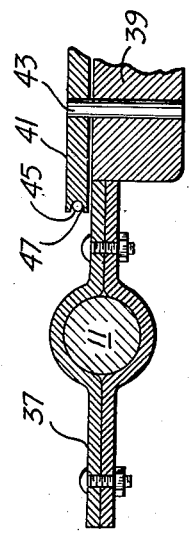
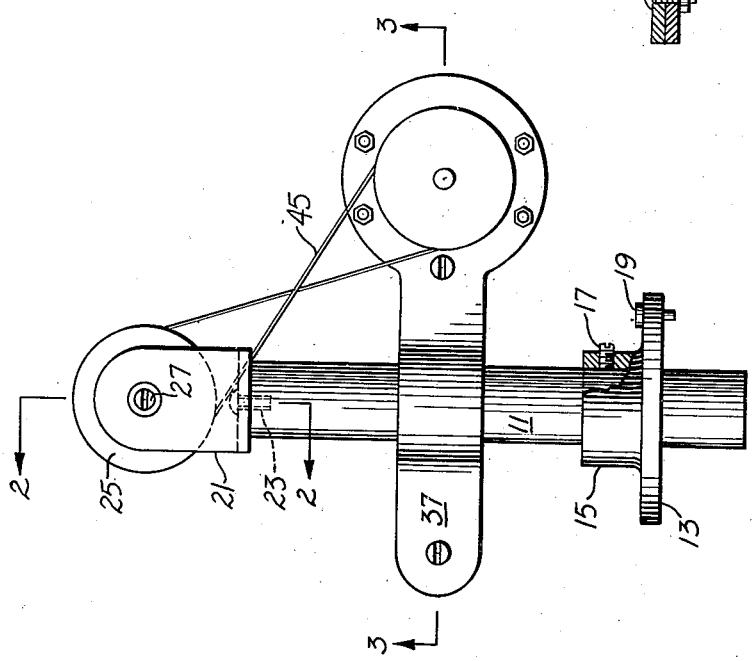
INVENTOR.
THOMAS F. BOYD
BY
Atty.

Patented Mar. 21, 1950

2,500,926

UNITED STATES PATENT OFFICE 2,500,926

X-RAY SPECTROMETER HOLDER AND METHOD

Thomas F. Boyd, Philadelphia, Pa.

Application July 11, 1947, Serial No. 760,419

3 Claims. (Cl. 250—52)

(Granted under the act of March 3, 1883, as amended April 30, 1928; 370 O. G. 757)

This invention relates to improvements in X-ray spectrometer holders and in methods of reproducing measurements obtained from X-ray beams diffracted by materials.

While X-ray diffraction has been used extensively for qualitative identification of compounds and elements, it has had only limited application to problems entailing quantitative analysis. Most of the X-ray diffraction in use presently employs various X-ray diffraction photographic cameras for registering the diffracted rays used in qualitative or quantitative analysis. However, photographic materials possess inherent disadvantages when used for registering intensities of X rays and other radiations. Among these disadvantages is the manner in which blackening of the plate or film occurs: the blackening of the film is not linear with radiation, so that a certain amount of radiation falls on the plate or film before any blackening occurs, then blackening increases proportionately with radiation for a period, and then either reaches a maximum or increases much more slowly as radiation continues. Another disadvantage of photographic materials is the fact that the silver and the bromine in the plate or film are excited by the X rays in such a manner as to produce undesired blackening. In addition, general radiation causes a large background to appear on the film, making interpretation more difficult.

While undesired background is decreased to a very considerable extent and X-ray patterns are obtained much faster by employing a Geiger-Müller tube instead of a photographic plate for registering diffracted X rays, there is an inherent difficulty in quantitative X-ray diffraction analysis that stems from the materials being examined. Most materials exhibit the phenomenon of preferred orientation, the molecules or groups of molecules having a tendency to line up in certain preferred directions, rather than to be distributed in a perfectly random fashion in all directions (random orientation). Such preferred orientation is one of the principal determinants of the intensity of any particular diffracted X-ray beam. For example, a single crystal of a substance may be so positioned that, for any particular atomic plane, given X rays of a particular wavelength, and angle between the incident X ray and the diffracted X-ray beams, the intensity of the diffracted beam is zero, while a point of maximum intensity can be recorded by turning the crystal about an axis but keeping the same wavelength, atomic plane and angle of incidence and diffraction. Since quantitative analysis depends on the ability to effect reproducible results, the existence of preferred orientation has curtailed sharply the application of the X-ray spectrometer to such use.

The primary object of this invention is to provide an X-ray spectrometer holder of simple and durable construction adapted to secure and rotate material for effective quantitative analysis of such material.

Another object is to provide a novel method of making quantitative analysis of a material.

Further objects and advantages of this invention, as well as its construction, arrangement and operation will be apparent from the following description and claims in connection with the accompanying drawing, in which Fig. 1 is an elevation of an X-ray spectrometer holder, partly broken away, showing a preferred embodiment of the invention;

Fig. 2 is a section thereof taken on the line 2—2 of Fig. 1; and

Fig. 3 is a fragmentary section thereof taken on the line 3—3 of Fig. 1.

Similar numerals refer to similar parts throughout the several views.

Rod 11, adapted to be seated in the specimen-holder bore of an X-ray spectrometer, carries a disc 13 having a collar 15, said disc and collar being mounted slidably on said rod and being adapted to be secured thereon in selected position by means of setscrew 17. Pin 19 extends through disc 13 and is adapted to secure said rod against rotation relative the spectrometer.

An elbow 21 mounted adjustably on an end of rod 11 by means of screw 23, carries pulley 25 on an axis normal to the longitudinal axis of said rod, said pulley 25 being secured rotatably to said elbow by means of pin 27 and having a grooved rim 29 adapted to carry the belt or line hereinafter described. An annular flange 31 extends from the face of pulley 25 distal pin 27, and seats sample-holder 33, which carries sample 35.

Split-collar clamp 37 is mounted on rod 11 between collar 15 and elbow 21. Said clamp carries motor 39, which is driven by suitable means (not shown), and pulley 41, coupled to the drive shaft 43 of said motor, is driven thereby. Crossed belt 45, riding in the grooved rim 47 of pulley 41 and the grooved rim 29 of pulley 25, drives pulley 25.

When a sample is mounted in the subject device, rotation of the holder by means of the structure described furnishes reproducible measurements of X-ray beams diffracted by the sample, when an X-ray spectrometer is employed to obtain the diffracted beams. Thus, quantitative analysis of materials by X-ray diffraction, using an X-ray spectrometer, can be made, since rotation of the material averages or neutralizes the effect of preferred orientation, by creating effectively a random orientation:

In use of the holder, the sample or material is secured in sample-holder 33 and elbow 21 adjusted to facilitate initial focusing of the X-ray beam. When the device is mounted on the spectrometer, the sample is rotated by operation of the motor 39 through belt drive 45. Thus, to determine the intensity of a diffracted X-ray line, the sample is placed in the holder and said holder is rotated manually about its longitudinal axis to the correct angle of diffraction for the particular line to be measured. The motor is started and the number of quanta counts registered on a meter over a certain period of time are noted. (It is to be observed that the quanta counts are proportional to the intensity of the diffracted rays.) The sample itself thus revolves around its horizontal axis during the counting period. The sample holder is then rotated on its longitudinal axis manually until the background adjacent to the line being measured is focused on the Geiger-Müller tube. The quanta counts are again made for the same period of time, and the background count subtracted from the original count to obtain the net count, or the count due to the line itself.

Various modifications and changes can be made in the subject device without departing from the scope of the invention.

The invention described herein may be manufactured and used by or for the Government of the United States of America for governmental purposes without the payment of any royalties thereon or therefor.

I claim:

1. An X-ray spectrometer sample-holder comprising a rod, means to mount said rod rotatably on an X-ray spectrometer, an elbow secured to an end of said rod and carrying a pulley on an axis normal to the longitudinal axis of said rod, a sample-holder mounted on a face of said pulley, and means to rotate said pulley about its axis.

2. An X-ray spectrometer sample-holder comprising a rod, a disc mounted slidably on said rod, means to secure said disc in selected position on said rod whereby said disc is adapted to seat said rod rotatably on an X-ray spectrometer, an elbow secured adjustably to the end of said rod distal said disc, a pulley mounted rotatably on said elbow on an axis normal to the longitudinal axis of said rod, a sample-holder secured to a face of said pulley, and a split-collar clamp mounted on said rod between said disc and said elbow, said clamp carrying a motor, said motor being coupled to said pulley in driving relation.

3. The method of making a quantitative analysis of a sample having a preferred orientation comprising securing said sample in an X-ray spectrometer, focusing the X-ray beam at the angle of diffraction of the line to be measured, rotating said sample about its axis at a uniform speed for a finite period, focusing the X-ray beam at the angle of diffraction of the background of said line, rotating said sample about its axis at the same uniform speed for the same finite period, and calculating the observed difference in intensity of the diffracted rays of said line and said background.

THOMAS F. BOYD.

REFERENCES CITED

The following references are of record in the file of this patent:

A. S. T. M., 1936, Symposium on Radiography, Discussion by L. Thomassen, p. 226.

Structure of Metals by C. S. Barrett, McGraw-Hill Book Co., 1943, figure 24, page 174.

Structure of Metals by C. S. Barrett, McGraw-Hill Book Co., 1943, figure 8, page 123.

Review of Scientific Instruments, Sept. 1946, Fig. 1, p. 345.